Figure 1:
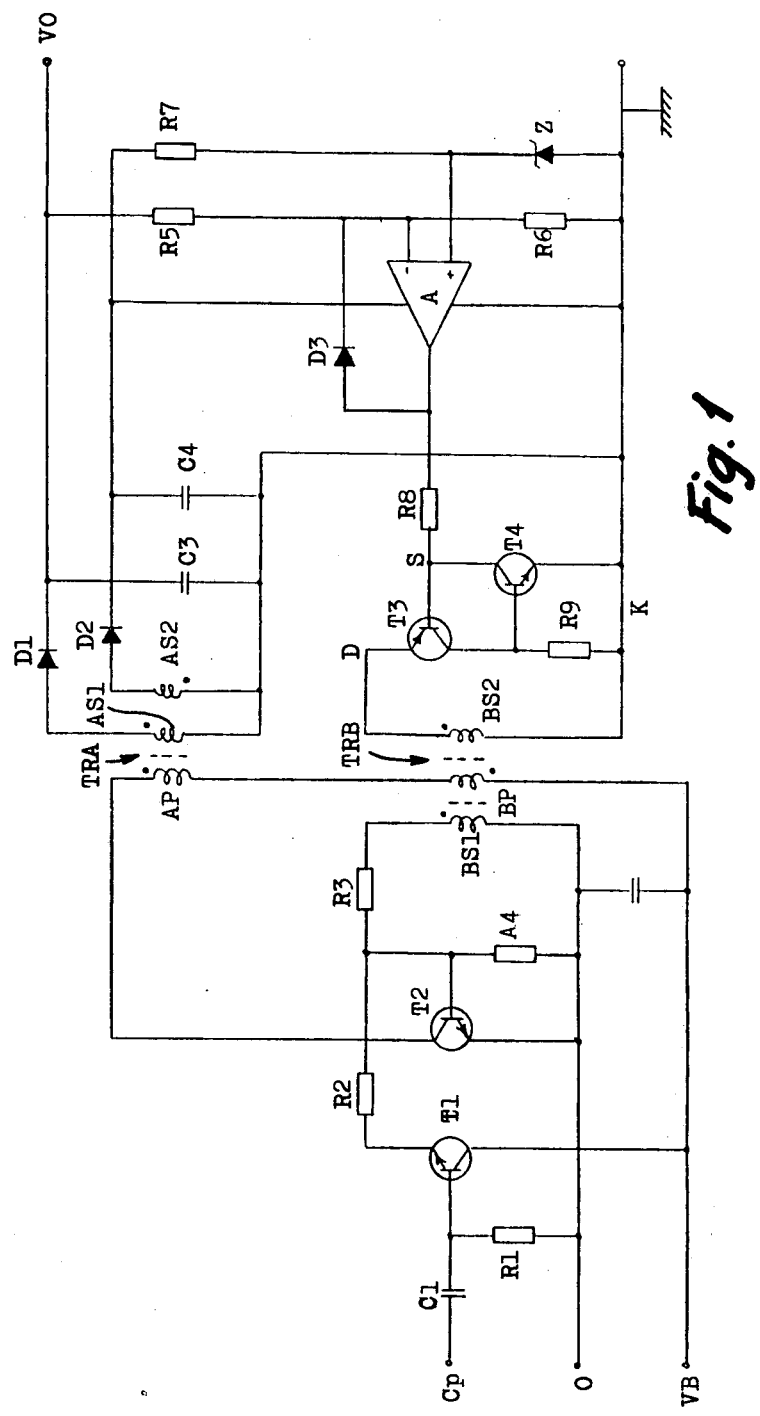

United States Patent [19]

Seiersen

[11] 4,135,233

[45] Jan. 16, 1979

[54] VOLTAGE CONTROL CIRCUIT FOR A DC-TO-DC CONVERTOR

[75] Inventor: Ole S. Seiersen, Kokkedal, Denmark

[73] Assignee: Christian Rovsing A/S, Herlev, Denmark

[21] Appl. No.: 805,108

[22] Filed: Jun. 9, 1977

[30] Foreign Application Priority Data

Jun. 10, 1976 [DK] Denmark .............................. 2576/76

[51] Int. Cl.² .......................................... H02M 3/335
[52] U.S. Cl. ........................................ 363/21; 363/97
[58] Field of Search ................ 331/112; 363/18–21, 363/27, 28, 30, 96, 97, 131, 135

[56] References Cited

U.S. PATENT DOCUMENTS

| | | | |
|---|---|---|---|
| 3,408,553 | 10/1968 | Bishop | 363/97 |
| 3,667,027 | 5/1972 | Martin | 363/96 X |
| 3,925,717 | 12/1975 | Kinnard | 363/20 |
| 3,935,526 | 1/1976 | Kamata et al. | 363/21 |
| 3,989,995 | 11/1976 | Peterson | 363/19 |

OTHER PUBLICATIONS

IBM Technical Disclosure Bulletin, "Magnetic Multivibrator Amplifier", A. Hakimoglu, vol. 2, No. 6, Apr. 1960, pp. 58–59.

Primary Examiner—William M. Shoop
Attorney, Agent, or Firm—Fleit & Jacobson

[57] ABSTRACT

A DC voltage convertor utilizes a switching transistor for switching the primary of a power transformer inserted in the emitter-collector circuit of the transistor, the base of the transistor is connected to the secondary of a control transformer which has its primary connected in series with the primary of the power transformer. A further secondary winding on the control transformer is connected to a transistor control circuit, which is controlled by a voltage dependent on the output voltage of the converter, provides voltage stabilization without galvanic connection between the primary and secondary sides.

6 Claims, 3 Drawing Figures

VOLTAGE CONTROL CIRCUIT FOR A DC-TO-DC CONVERTOR

Electrical equipment in satellites is driven by solar cell batteries whose voltage may vary greatly, for example from 20 to 50 volts. This voltage has to be converted into a plurality of different D.C. supply voltages which must be stabilized. It is further required that the various voltage supply circuits are galvanically separated both from each other and from the primary voltage circuit.

To solve this task, transistor connections of the push-pull type are generally used, in which two alternately conductive transistors drive the primary winding of a transformer which has a separate secondary winding for each device coupled to the converter. This type of converter necessitates the use of a control circuit on the primary side to stabilize the primary voltage of the transformer and, in addition, a separate control circuit in each individual secondary circuit to stabilize the supply voltage concerned. The control equipment thus required is bulky and so energy-consuming as to have a strongly reducing effect on the efficiency of the convertor.

The prior art also includes transistor convertors known as the energy storage type containing a transistor circuit with an alternately conductive and switched off transistor whose emitter-collector circuit is composed partly of the primary winding of a load transformer, partly of the primary winding of a control transformer having a secondary winding connected to the base emitter circuit of the transistor. In a transformer of said type, the secondary winding of the load transformer is connected to an energy-storing condenser through a diode, whereby a periodic transfer of energy is effected from the magnetic field of the transformer to the condenser. The amount of energy transferred and hence the voltage supplied can be controlled based on the deviation of the voltage from the desired value by changing the amount of energy accumulated in each period.

However, it has previously been difficult, in a simple manner, to obtain control of parameters in a circuit which is galvanically separated from another circuit in which the reference and/or measuring signal is generated.

The present invention relates to a voltage control circuit for a DC-to-DC convertor of the type comprising a transistor circuit with an alternately conductive and switched off transistor, the emitter-collector circuit of said transistor being composed partly of the primary winding of a load transformer, partly of the primary winding of a control transformer having a secondary winding connected to the base emitter circuit of the transistor.

It is an object of the invention to provide a voltage control circuit which makes it possible with a single control circuit to undertake the desired voltage stabilization without galvanic connection between the primary and secondary sides.

This object is achieved by an embodiment of the voltage control circuit according to the invention in which the control transformer is provided with a further winding whose ends are connected to a source electrode and a drain electrode, respectively, of a transistor circuit which also has a control electrode to which is supplied a control voltage dependent on the output voltage, said transistor circuit being adapted to substantially short-circuit the winding when the winding voltage attains a predetermined value in relation to the control voltage.

Said construction enables the fault voltage to interfere with and interrupt the energy storage phase of each individual working period at precisely the time corresponding to the desired voltage being maintained.

In an advantageous embodiment of the transistor circuit forming part of the control circuit according to the invention, said transistor circuit comprises a first transistor whose emitter-collector circuit is connected to the transformer winding in series with a resistor, the base of said first transistor being connected to the control electrode, and a second transistor whose emitter-collector circuit is connected between the base of said first transistor and that end of the resistor which is connected to the winding, the base of said second transistor being connected to the other end of the resistor so that the emitter of said first transistor constitutes said drain electrode, and the emitter of said second transistor constitutes said source electrode.

In yet another embodiment of the control circuit according to the invention there is provided a diode in series with said further transformer winding and the transistor circuit, the forward direction of said diode being the same as that of the transistor circuit, said diode being connected to that end of the winding which is not connected to ground, and a second diode, one end of said diode being connected to the interconnection between said end of the winding and the first-mentioned diode, the other end of said diode being coupled to a voltage so polarised that the magnetizing current of the transformer winding will flow through the second diode. By means of these measures, magnetizing current from the further winding is prevented from reversing through the transistor circuit.

In still another embodiment of the control circuit according to the invention the drain electrode of the transistor circuit is connected to ground, and a resistor is provided between the control electrode and the source electrode of the transistor circuit, which construction constitutes a preferred ground connection of the transistor circuit.

Improved protection of the transistor circuit is provided in yet another embodiment of the control circuit according to the invention in which the control electrode is connected to ground through a diode which is conductive towards ground.

In a further embodiment of the transistor circuit forming part of the control circuit according to the invention said transistor circuit consists of a programmable unijunction transistor whose anode terminal constitutes said drain electrode, whose cathode terminal constitutes said source electrode, and whose control terminal constitutes said control electrode.

Figure 2:
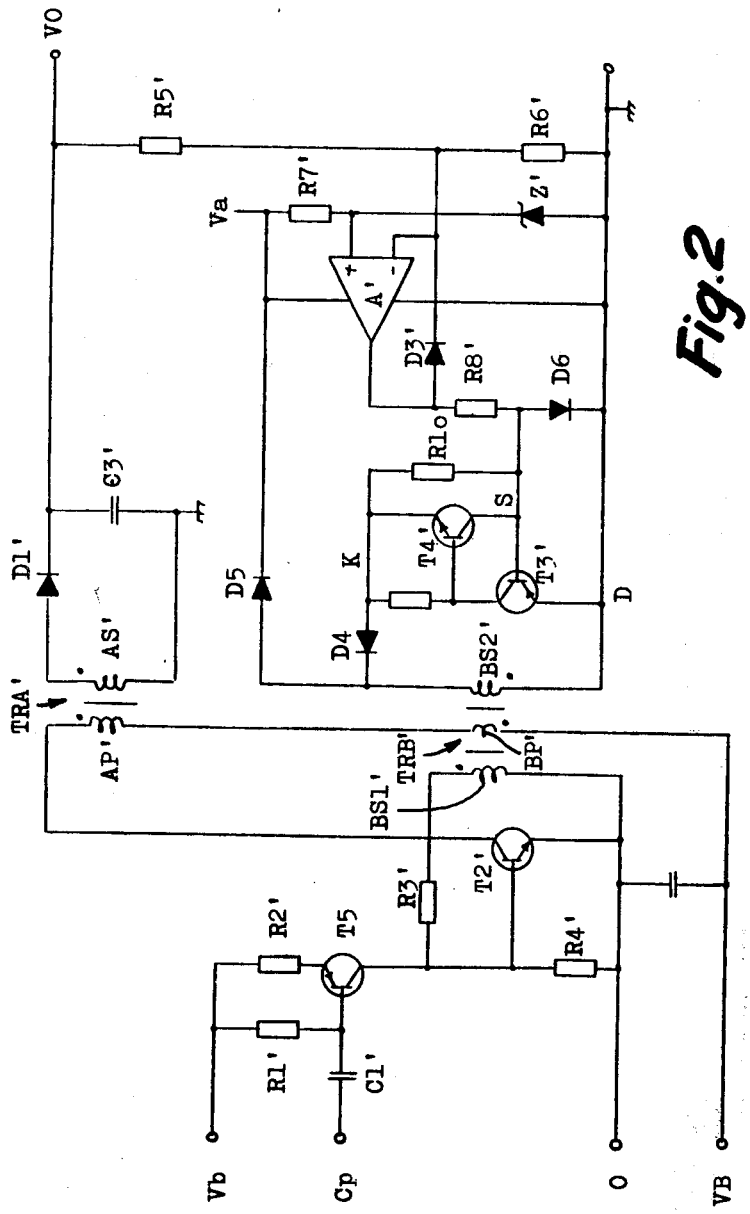

The invention will be described in greater detail below with reference to the drawings in which FIG. 1 shows one embodiment of the voltage control circuit according to the invention, and FIG. 2 shows another embodiment of the voltage control circuit according to the invention.

Figure 3:
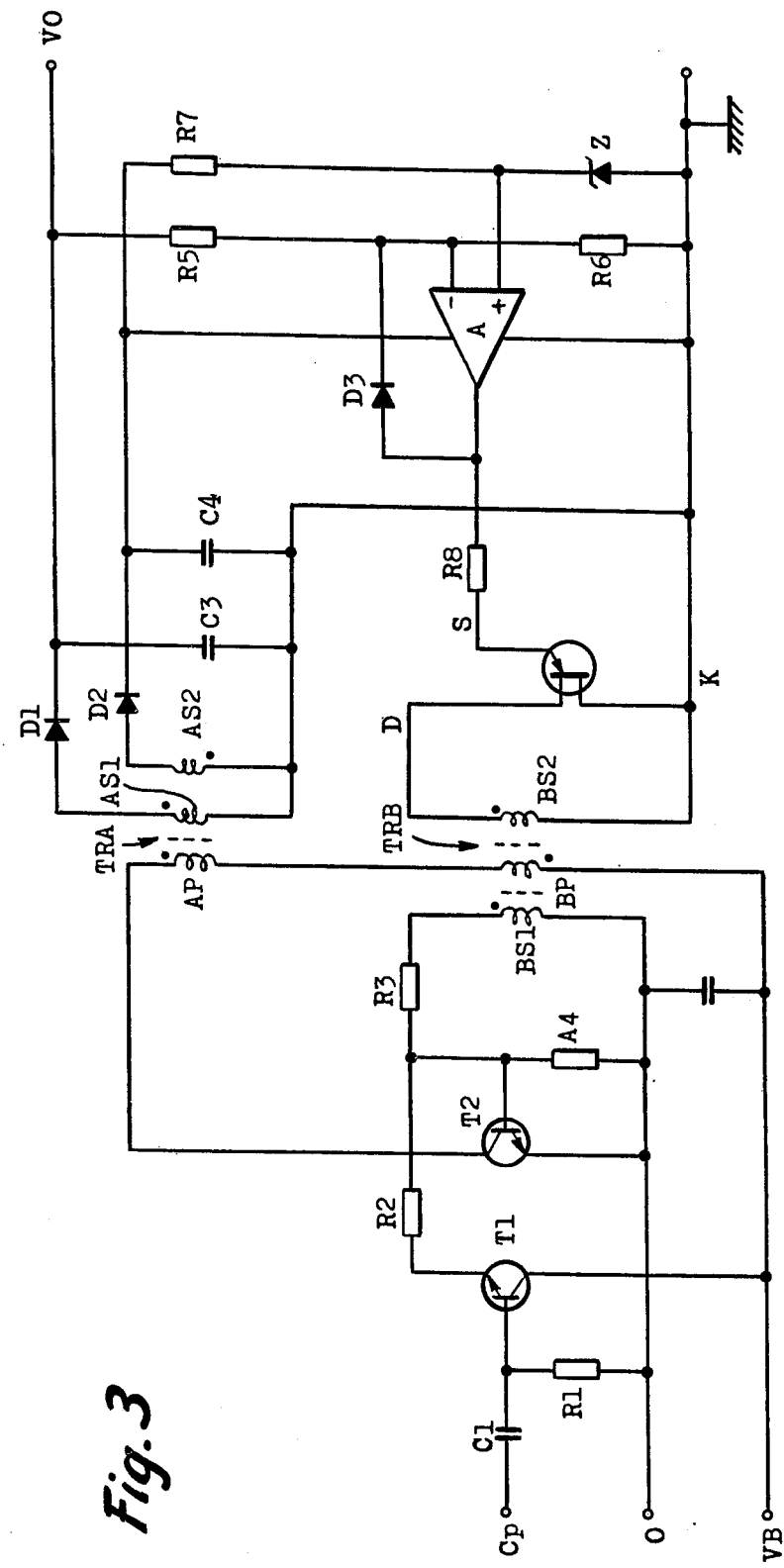

FIG. 3 shows still another embodiment of the voltage control circuit according to the invention.

On a drive pulse terminal cp there is supplied a periodic square signal which is transferred, through a differentiating network C1R1, to the base of a transistor T1 as a sudden voltage rise, the voltage decreasing with the time constant determined by $C1 \times R1$. The voltage rise is positive and of a size so that, being transferred via resistors R2 and R4 to the base of another transistor T2, it saturates the latter transistor. The voltage $+V_B$ existing across the collector-emitter of the transistor T2 before said transistor was conductive, will in all essentials exist across the primary winding AP of a load transformer TRA when the transistor T2 is saturated. Resulting from the self-induction of the winding AP the constant voltage $V_B$ will occasion an increasing current through the winding AP and a series-connected winding BP of a control transformer TRB. Said transformer has two secondary windings BS1 and BS2, BS1 loading the primary winding BP as if it were a current transformer so that a current is induced through the winding BS1, said current increasing proportionately to the current through T2, AP and BP, and being transferred to the base of the transistor T2 via a resistor R3 and the resistor R4. The induced current is preferably ten times smaller than the collector current of the transistor T2, and since the current amplification of the transistor T2 is in any case not less than ten, the induced current will therefore be capable of keeping the transistor saturated. On the assumption that the transformer TRB does not noticeably load the transistor T2, a constant voltage $V_B$ will therefore exist across the winding AP, through which will flow a current increasing proportionately to time, said current inducing currents in the secondary windings AS1 and AS2 of the transformer TRA. The winding AS1 is connected to a diode D1 in series with a condenser C3 over which the secondary current of the convertor is tapped at a voltage $V_O$ in relation to a ground terminal which is galvanically operated from the O-terminal of the primary side, and the coil AS2 is connected to a diode D2 in series with a condenser 64 over which current is tapped for a voltage regulator which will be described later on. The induced secondary currents are directed in the reverse direction of the diode D1 and in the forward direction of the diode D2, and on the assumption that the load connected via the diode D2 is small, the transformer TRA may therefore be regarded as operating at no-load as long as the current through the transistor T2 is increasing. The same no-load state applies to the secondary winding BS2 of the transformer TRB, there being induced in said winding, which is practically unloaded, a voltage which is proportional to the voltage across the winding BS1. The voltage across the winding BS2 thus represents a measure of the collector current through T2 and hence a measure as to how long the voltage across the coil AP is equal to $V_B$. The voltage across the winding BS2 is therefore also a measure of the amount of energy that is stored in the magnetic field of the transformer TRA while the transistor T2 is conductive.

As previously mentioned, the winding AS2 supplies power to a voltage regulator for the voltage VO. Via resistors R5 and R6 a certain fraction of this voltage is transferred to the negative input terminal of an operational amplifier A, and to the other, positive input terminal of the amplifier is supplied a reference voltage from a Zener diode Z to which current is supplied through a resistor R7. The output signal of the amplifier A is transferred via a resistor R8 to the base of a transistor T3 and to the collector of another transistor C4.

These two transistors together with a resistor R9 constitute an embodiment of a transistor circuit having a drain electrode D, a source electrode K, and a control electrode S, to which the output signal of the amplifier A is transferred The drain electrode is connected to one end of the winding BS2, while the source electrode K is connected to the other end of said winding and to the previously mentioned ground terminal which is galvanically separated from the O-terminal of the primary side. The output voltage of the amplifier A is positive, and the transistor T3 will therefore be non-conductive as long as the voltage across the winding BS2 plus the base emitter voltage drop of the transistor T3 is lower than the base voltage of the transistor T3. In said state, as previously mentioned, the winding BS2 will not load the transformer TRB. At the very moment that the voltage across the winding BS2 plus the said base emitter voltage drop becomes equal to the voltage on the base of the transistor T3, said transistor will become conductive, whereby current is supplied to the base of the transistor T4 resulting in a positive base emitter voltage determined by the resistor R9. In this way the transistor T4 becomes conductive and reduces the voltage on the base of the transistor T3 so that transistors T3 and T4 amplify each other for short-circuiting winding BS2 except for a slight voltage drop across the transistors. The resistor R8 secures the amplifier A against short-circuiting. When the winding BS2 is short-circuited, said winding will take over the current through the winding BS1 so that base current is no longer supplied to the transistor T2. The transistor T2 will therefore be cut off, and this will happen very quickly seeing that, as mentioned above, the transistors T3 and T4 are mutually self-amplifying. If the secondary winding of the transformer TRA were not loaded, this momentary switching off of the transistor T2 would in theory occasion an infinitely high voltage across the winding AP. However, the secondary winding of the transformer TRA is now loaded because the current direction has been changed from previously so that the diode D1 is conductive. The energy stored in the magnetic field of the winding AP just before the transistor T2 was cut off will therefore be transferred to the load and the condenser C3, and as said condenser is large, the energy transfer will take place at a substantially fixed voltage VO which is controlled by the voltage regulator in the manner described below.

The collector current of the transistor T2 must—within a fraction of the period determined by the frequency of the drive signals which are supplied to the terminal cp—rise from O to a value dependent on the magnitude of the load. If it is assumed that the circuit operates at a load corresponding to the transistor T2 being conductive during a certain fraction of the said period and that the load subsequently increases, the voltage VO will drop, which will be detected by the amplifier A which is arranged so that the voltage on the base of the transistor T3 is thereby increased. This involves that the current through the transistor T2 during the next period will flow for a period of time longer than said fraction, whereby a larger amount of energy is stored in the winding AP so that the desired voltage VO can be maintained although the load has grown. If the voltage VO were to rise instead, this would reversely result in a voltage drop on the base of the transistor T3 whereby the transistor T2 will transfer current during a smaller fraction of the next period.

The ratio of windings of the transformer TRA and TRB and the voltages $V_b$ and VO determine the temporal division of a period into accumulation of energy in the winding AP and into delivery of said energy to the condenser C3. Depending on the load conditions the period will be fully or partly taken up by these energy transfers. Without an external load, the no-load losses in the circuit will ensure that the transistor T2 is conductive at least for a short moment of each period so that the voltage regulation can be supplied with current, and in case the load becomes excessive, a diode D3 feeding back the amplifier A will ensure that the transistor T2 carries current only during the maximum allowable fraction of the period, because said diode ensures that the output voltage of the amplifier A cannot exceed the Zener diode voltage plus the diode voltage. This will apply even if the secondary side of the convertor were to be short-circuited, and it should be noted that such short-circuiting does not inactivate the voltage regulator as it is supplied with current during that fraction of the period in which the diode D1 is non-conductive corresponding to the transistor T2 being conductive. Thus, the convertor output is also secured against short-circuiting, the reason being that in case of short-circuiting it will function as if it were subjected to maximum operating load.

At the short-circuiting of the winding BS2 said winding takes over the current which before the short-circuiting passed through the winding BS1. The control transformer TRB, however, is not ready for another period beginning with the transistor T2 becoming conductive again, until the magnetic field of the winding BS2 has disappeared. This is effected by biasing the base-emitter junction of the transistor T3 opposite the conductive direction to the breakdown voltage, whereafter the magnetizing current of the winding BS2 flows through the transistor in the direction out of the emitter. In the long run, the transistor T3 will be damaged by this reverse current, which might be avoided by inserting a blocking diode in the emitter wire and by inserting a clamping diode between a negative voltage and the interconnection between the winding BS2 and the blocking diode. An example of such use of a blocking and clamping diode will be explained in greater detail in connection with the embodiment of the invention shown in FIG. 2.

The embodiment shown in FIG. 2 differs in several ways from the previously described embodiment although most of the components correspond to the components already mentioned and are identified by corresponding reference numerals which are provided with a mark ('). The components involving a basic change from previously have not been provided with a mark.

First of all, the drain electrode D of the transistor circuit, which corresponds to the emitter on the transistor T3', is connected to ground, and a resistor R10 has been inserted between the source electrode K, i.e. the emitter on the transistor T4', and the control electrode S. It has proved expedient with a view to the stability of the transistor circuit that the drain electrode D is connected to ground, and furthermore this embodiment presents an advantage in connection with the above-mentioned means for preventing magnetizing current from reversing through the transistor circuit, viz. that the clamping diode D5 can be connected to the positive voltage supply for the amplifier A'. In the previously described embodiment, the control voltage from the amplifier A was compared to the voltage on the drain electrode, i.e. the emitter of the transistor T3, produced across the winding BS2. In the embodiment shown in FIG. 2, this emitter voltage is constant, and instead the comparison is made by means of the voltage divider composed of the resistors R8' and R10, where the output voltage from the amplifier A' is supplied to the resistor R8', while the voltage produced across the winding BS2' is supplied to the resistor R10, so that the control signal to the counter electrode S is generated as a result of voltage division and superposition of the said two voltages. To protect the base-emitter junction on the transistor T3' there is provided a diode D6 whose anode is connected to the base of said transistor while the cathode of the diode D6 is connected to ground.

The circuit further contains a diode D4 which is inserted in series with the winding BS2' and the transistor circuit between the source electrode of said winding and that end of the winding which is not connected to ground. The purpose of said diode D4 is to prevent magnetizing current from reversing through the transistor T3', it being remembered from previously that the winding BS2', by short-circuiting through the transistor circuit, takes over the operating basis current to the transistor T2' through the winding BS1'. The circuit will not be cleared and prepared for another period until the magnetic energy stored in the winding BS2' has disappeared. This is effected by the winding BS2' producing the current Im shown in FIG. 2, which will be unable to flow through the transistor circuit owing to the diode D4, but will flow through the previously mentioned clamping diode D5 which is connected to a stable voltage, said voltage being, as shown in the figure, expediently the supply voltage for the amplifer A'. The supply circuit for production of the voltage $+V_a$ is not shown in FIG. 2, but it might be designed as shown in FIG. 1, or be designed in a known manner, galvanically separated from the primary side of the convertor.

Finally, the embodiment shown in FIG. 2 differs from the embodiment shown in FIG. 1 in that the transistor T5 is a PNP-transistor, which, compared to the circuit comprising a NPN-transistor T1 shown in FIG. 1 results in a trigger generator with a high output impedance so that the base on the transistor T2' is not loaded by the transistor T5.

In principle, the transistor circuits shown in FIGS. 1 and 2 function in the same manner as a programmable unijunction transistor which may therefore be inserted instead of the shown transistor circuits, the anode terminal of the unijunction transistor being connected as the drain electrode D, the cathode terminal being connected as the source electrode K, while the control terminal is connected as the control electrode S.

A person skilled in the art will, of course, understand that a transistor circuit, like the one shown in FIG. 1, or in the form of the above programmable unijunction transistor, can be provided with a diode in series with the additional winding (like D4 and FIG. 2) to prevent the magnetizing current of the winding from reversing through the transistor circuit. This diode is preferably combined with a clamping diode, which may be fitted like D5 in FIG. 2, but can also be similarly inserted in the other secondary winding of the control transformer, wherein the secondary winding is connected to the base of the switching transistor or to the primary winding of the control transformer.

What I claim is:

1. A voltage control circuit for a DC-to-DC convertor of the type comprising a transistor circuit with an alternately conductive and switched off transistor, the emitter-collector circuit of said transistor being composed partly of the primary winding of a load transformer, partly of the primary winding of a control transformer having a secondary winding connected to the base emitter circuit of the transistor, wherein the control transformer is provided with a further winding whose ends are connected to a souce electrode and a drain electrode, respectively, of a transistor circuit which also has a control electrode to which is supplied a control voltage dependent on the output voltage, said transistor circuit being adapted to substantially short-circuit the winding when the winding voltage attains a predetermined value in relation to the control voltage.

2. A control circuit according to claim 1, wherein the transistor circuit comprises a first transistor whose emitter-collector circuit is connected to the transformer winding in series with a resistor, the base of said first transistor being connected to the control electrode, and a second transistor whose emitter-collector circuit is connected between the base of said first transistor and that end of the resistor which is connected to the winding, the base of said second transistor being connected to the other end of the resistor so that the emitter of said first transistor constitutes said drain electrode, and the emitter of said second transistor constitutes said source electrode.

3. A control circuit according to claim 1, wherein there is provided a diode in series with said further transformer winding and the transistor circuit, the forward direction of said diode being the same as that of the transistor circuit, said diode being connected to that end of the winding which is not connected to ground, and a second diode, one end of said diode being connected to the interconnection between said end of the winding and the first-mentioned diode, the other end of said diode being coupled to a voltage so polarised that the magnetizing current of the transformer winding will flow through the second diode.

4. A control circuit according to claim 1, wherein the drain electrode of the transistor circuit is connected to ground and a resistor is provided between the control electrode and source electrode of the transistor circuit.

5. A control circuit according to claim 4, wherein the control electrode is connected to ground via a diode which is conductive towards ground.

6. A control circuit according to claim 1, wherein the said transistor circuit consists of a programmable unijunction transistor, whose anode terminal constitutes said drain electrode, whose cathode terminal constitutes said souce electrode, and whose control terminal constitutes said control electrode.

* * * * *